(12) United States Patent
Landschoff

(10) Patent No.: US 6,802,201 B2
(45) Date of Patent: Oct. 12, 2004

(54) METHOD AND DEVICE FOR MONITORING A SENSOR

(75) Inventor: Otwin Landschoff, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 10/111,250

(22) PCT Filed: Jun. 23, 2001

(86) PCT No.: PCT/DE01/02320
§ 371 (c)(1),
(2), (4) Date: Aug. 9, 2002

(87) PCT Pub. No.: WO02/12697
PCT Pub. Date: Feb. 14, 2002

(65) Prior Publication Data
US 2003/0029222 A1 Feb. 13, 2003

(30) Foreign Application Priority Data
Aug. 5, 2000 (DE) ......................................... 100 38 338

(51) Int. Cl.$^7$ .............................................. G01L 27/00
(52) U.S. Cl. ....................................................... 73/1.57
(58) Field of Search ................................ 73/1.57, 118.1

(56) References Cited

U.S. PATENT DOCUMENTS

| 4,498,443 A | | 2/1985 | Hasegawa et al. |
| 4,844,038 A | | 7/1989 | Yamato et al. |
| 5,687,700 A | * | 11/1997 | Kato ........................... 123/688 |
| 6,009,866 A | * | 1/2000 | Sagisaka et al. ............ 123/681 |

FOREIGN PATENT DOCUMENTS

| DE | 40 32 451 | 4/1992 |
| EP | 0 769 612 | 4/1997 |
| JP | 2000 097099 | 4/2000 |

OTHER PUBLICATIONS

Patent Abstracts of Japan, vol. 2000, No. 07, (Sep. 29, 2000).

* cited by examiner

*Primary Examiner*—Robert Raevis
(74) *Attorney, Agent, or Firm*—Kenyon & Kenyon

(57) ABSTRACT

A method and a device for monitoring a sensor, e.g., a sensor for measuring a pressure variable which characterizes the pressure of the air supplied to the internal combustion engine. A fault is detected if a change in an operating variable that characterizes the quantity of fuel to be injected results in no corresponding change in the output variable of the sensor.

9 Claims, 3 Drawing Sheets ered from operation according to the present invention

METHOD AND DEVICE FOR MONITORING A SENSOR

FIELD OF THE INVENTION

The present invention relates to a method and a device for monitoring a sensor.

BACKGROUND INFORMATION

A method and a device for monitoring a sensor that measures a pressure variable that corresponds to the pressure of the air entering the internal combustion engine is known from German Published Patent No. 40 32 451. In that publication, various methods and modes of operation for monitoring a boost pressure sensor are described. The output signal of the boost pressure sensor is compared to a reference variable. Used as the reference variable is the output signal of a second boost pressure sensor. In an example embodiment, in certain operating states, for example, in response to small loads and rotational speeds, the output signal of the boost pressure sensor is compared to that of an atmospheric pressure sensor. In stationary operating states, the measured value is compared to a value that is calculated on the basis of the fuel quantity and the engine rotational speed.

Disadvantageous in this mode of operation is the fact that a further sensor is required or the monitoring may only be performed in certain operating states. If these operating states are only seldom achieved, then under certain circumstances long operating phases result in which a defective boost pressure sensor is used.

SUMMARY OF THE INVENTION

Because a fault is detected if a change in an operating variable characterizing the quantity of fuel injected does not result in a corresponding change in the output variable of the sensor, reliable detection may be possible, especially in the dynamic operation of the internal combustion engine. As the operating variable characterizing the quantity of fuel injected, various variables may be used. Thus it may be possible to use different torque variables, such as the input torque, drive signals for quantity control elements, or other variables that arise in a controlling arrangement for an internal combustion engine. It may be advantageous to use the mode of operation according to the present invention in a boost pressure sensor which measures the pressure of the air that is fed to the internal combustion engine. The mode of operation, however, may also be used in the case of other sensors.

Certain faults such as the icing up of a sensor only arise in response to specific operating states, so it may be advantageous if the monitoring of the sensor is made to be a function of the presence of certain operating states.

The icing up of the sensor only occurs in certain ranges of the air temperature. The monitoring occurs if a variable that characterizes the air temperature is smaller than a threshold value. Monitoring is only reliable and/or capable of great precision if preestablished rotational speed values and/or fuel quantity values are present. The monitoring occurs if predetermined values exist for the rotational speed and/or the quantity of fuel injected.

It may be advantageous if a substitute value is used in response to a detected fault. One substitute value that may be easy to calculate derives from the rotational speed and the quantity of fuel injected. By using the substitute value, it may be possible to continue to operate the internal combustion engine even in the event of a fault, the control precision of the internal combustion engine is only slightly impaired.

The present invention is discussed below on the basis of the example embodiments depicted in the drawing.

DETAILED DESCRIPTION

The mode of operation according to the present invention is described below on the basis of an example of a boost pressure sensor. However, the present invention is not limited to this application. The mode of operation according to the present invention may be used in all sensors in which a change in an operating variable results in a corresponding change in the output signal of the sensor. The mode of operation according to the present invention may also be used in a sensor for measuring the air quantity, a variable correlated with the boost pressure, or a variable characterizing the boost pressure. The mode of operation may also be used in a sensor for measuring the air quantity.

Figure 1:
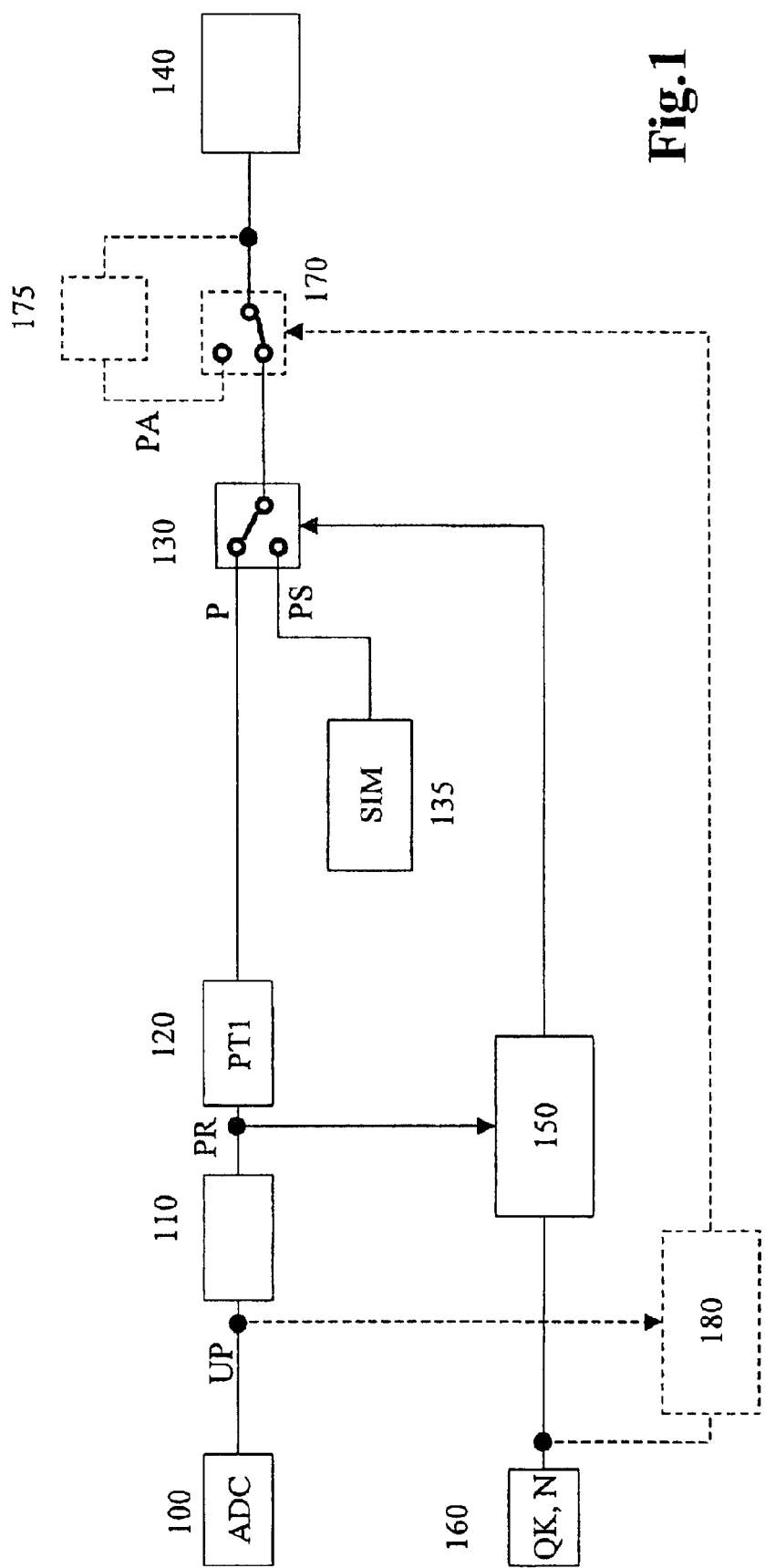
FIG. 1 depicts a block diagram of the system for measuring the boost pressure.

In FIG. 1, a sensor for measuring the boost pressure and the associated analog/digital converter are designated as 100. The latter supplies a signal UP, that corresponds to the boost pressure, to a characteristic curve 110. There, this variable is converted into a signal PR, which in turn is supplied to a filter 120. Output signal P of filter 120 may be conveyed via a first switching unit 130 to a controlling arrangement 140, which further processes this signal, in order, in this manner, to drive the internal combustion engine or actuators that are arranged in the internal combustion engine.

Applied at the second input of first switching unit 130 may be an output signal PS of a simulation unit 135. This simulation unit 135 may calculate a simulated boost pressure PS on the basis of a variety of variables.

Switching unit 130 may be driven by a first monitoring unit 150. This means that in response to a detected fault, the first monitoring may switch first switching unit 130 into a position such that output signal PS of simulation unit 135 arrives at controlling arrangement 140. First monitoring unit 150 may evaluate the signals of various sensors 160, which characterize, for example, fuel quantity injected QK and/or rotational speed N of the internal combustion engine. Furthermore, output signal PR of characteristics map 110 may be advantageously evaluated for fault monitoring. Alternatively, or in addition, output signal P of filter 120 or output signal UP of the A/D converter of sensor 100 may be processed directly.

An example embodiment is depicted by the dotted lines. In this example embodiment, between first switching unit 130 and controlling arrangement 140 a second switching unit 170 may be arranged, which may be driven by a second monitoring unit 180. In the event of a fault, second monitoring unit 180 drives switching unit 170 so that output signal PA of a delay unit 175 arrives at controlling arrangement 140. This has the result that, in the event a defect is detected, the value most recently recognized as fault-free may be kept.

The sensor output signal made available by an A/D converter may be converted from characteristic curve 110 into a variable PR that corresponds to the pressure. After evaluating the various signals using the first monitoring and/or the second monitoring, various faults may be detected.

As a result of the corresponding driving of first switching unit 130 and/or second switching unit 170, a substitute value PS, or a previously stored value PA, may be used by controlling arrangement 140 as the substitute value in response to a detected fault, for controlling the internal combustion engine. For this purpose, delay unit 175 stores the value most recently recognized as fault-free. This old value PA, stored in delay unit 175, may then be used in the controlling of the internal combustion engine.

Using the first monitoring and/or the second monitoring, various faults may be detected. Thus, for example, a signal-range check may be provided at a minimum and/or a maximum value for signal UP or signal PR. Furthermore, in certain operating conditions, a plausibility check may be performed using a further sensor, such as an atmospheric pressure sensor.

In addition, it may be possible in accordance with the present invention to provide that a plausibility check may be performed using the injection quantity and/or another operating variable that has an essential influence on the boost pressure. This plausibility check may be performed such that a fault is detected if a change in the operating variable does not result in a corresponding change in the output variable of the sensor.

As the operating variable, it may be advantageous to use a variable which characterizes the quantity of fuel injected. For this purpose, on the one hand, it may be possible to use a setpoint value for the quantity of fuel to be injected and/or an actuating variable that is used for driving an actuator that determines the fuel quantity. For example, the drive duration of an electromagnetic valve or of a piezo actuator may be suitable. This monitoring is depicted in greater detail in FIG. 2.

If a corresponding fault is detected, then first switchover unit 130 switches over to simulated substitute signal PS. This means that the functional capacity of the sensor may be monitored and, in response to a defect, substitute signal PS may be used. For determining the substitute signal, variables may be used which characterize the operating state of the internal combustion engine. The value determined in this manner is also filtered using a filter which includes a delaying component. A more detailed representation of the derivation of the substitute value may be found in FIG. 3.

Figure 2:
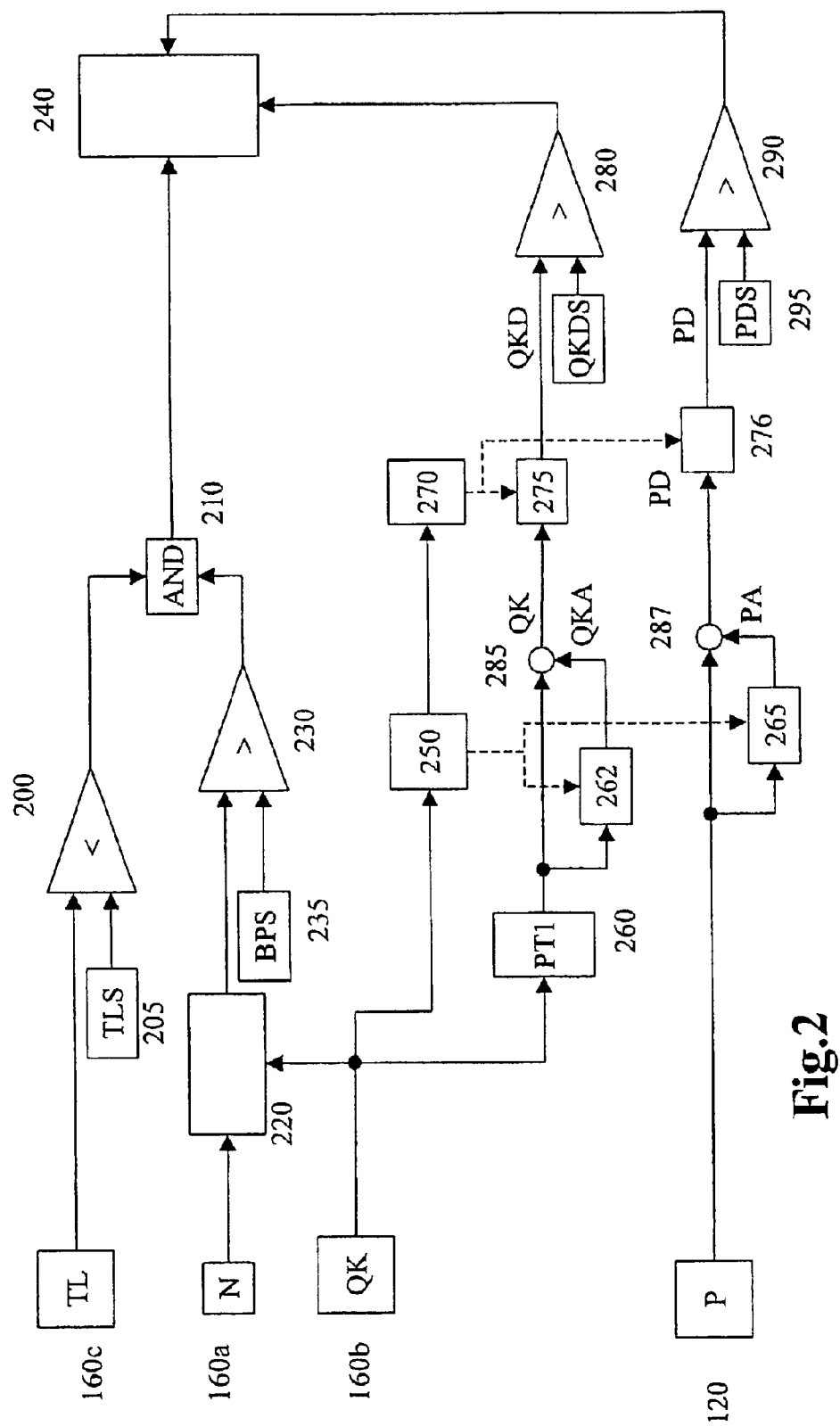
FIG. 2 depicts a detailed representation of the monitoring of the boost pressure.

First monitoring unit 150 is depicted in greater detail, by way of example, in FIG. 2. In certain operating states, it may occur that boost pressure value UP remains constant although the actual boost pressure changes. A fault of this type may also be termed a freezing or icing up of the sensor. To detect this fault, the fault monitoring depicted in FIG. 2 may be performed.

The monitoring according to the present invention only occurs in certain operating states. If an operating state of this type exists, in which the charge air temperature is below a threshold value TLS, and the rotational speed and the quantity of fuel to be injected are within certain value ranges, then after a reversal of sign in response to the change in the quantity of fuel to be injected, the instantaneous quantity and the instantaneous boost pressure may be stored as old values QKA and PA, respectively. Simultaneously, a time counter starts up. After the conclusion of a waiting time, differences QKD between old stored value QKA and instantaneous value QK of the injection quantity may be calculated. Accordingly, change PD in the pressure may be determined in this waiting time.

If the amount of the difference between the fuel quantity values is greater than a threshold value QKDS, then the amount of the change in the boost pressure must be greater than a threshold value PDS. If this is not the case, then a fault is detected.

In FIG. 2, an example embodiment of a monitoring device of this type is depicted. Supplied to a first comparator 200 may be output signal TL of a temperature sensor 160c, which makes available a signal that corresponds to the charge air temperature. Additionally supplied to comparator 200 from a threshold value input 205 is a threshold value TLS. Comparator 200 acts upon an AND gate 210 using a corresponding signal. Supplied to a second comparator 230 may be the output signal of a characteristics map 220, at whose input rotational speed signal N from rotational speed sensor 160a is applied. In addition, characteristics map 220 may process a variable QK, which characterizes the quantity of fuel to be injected and which may be advantageously made available by a quantity controlling arrangement 160b. Also supplied to comparator 230 by a threshold value input 235 may be a threshold value BPS. Comparator 230 also acts upon AND gate 210 using a corresponding signal.

Variable QK subsequently may arrive at a sign detection unit 250 and a filter 260. Using the output signal of sign detection unit 250, a time counter 270 as well as a first storage unit 262 and a second storage 265 may be acted upon.

The output signal of filter 260 may arrive, on the one hand, directly bearing a positive sign at a node 285 and, on the other hand, via first storage unit 262 bearing a negative sign at the second input of node 285. Node 285 may act upon a switching unit 275 using a variable QKD. The output signal of switching unit 275 QKD arrives at a third comparator 280, at whose second input output signal QKDS of a threshold value input 285 is applied. Evaluation unit 240 is also acted upon by the output signal of comparator 280.

Output signal P of filter 120 may arrive, on the one hand, directly carrying a positive sign at a node 287 and, on the other hand, via second storage 265 carrying a negative sign at the second input of node 287. Node 287 may act upon a switching unit 276 using a variable PD. The output signal of switching unit 276 PD may arrive at a fourth comparator 290, at whose second input output signal PDS of a threshold value input 295 is supplied. Evaluation unit 240 may also be acted upon by the output signal of comparator 290.

First comparator 200 may compare measured charge air temperature TL to threshold value TLS. If measured charge air temperature TL is smaller than threshold value TLS, then a corresponding signal arrives at AND gate 210. Characteristics map 220, on the basis of at least the rotational speed and/or the quantity of fuel to be injected, calculates a characteristic value that characterizes the operating state of the internal combustion engine. This characteristic value in comparator 230 may be compared to threshold value BTS. If the characteristic value for the operating state is larger than threshold value BPS, then a corresponding signal may be sent to AND gate 210. If both conditions are fulfilled, i.e., the temperature of the air is smaller than the threshold value TLS and certain operating conditions exist, then a monitoring may be possible.

This logic unit, composed of comparators 200 and 230, threshold value inputs 205 and 235, characteristics map 220, and the AND gate, results in the monitoring of the sensor signal as a function of the existence of certain operating states. The monitoring may be performed only if the air temperature is smaller than a threshold value and if certain values for the rotational speed and/or the quantity of fuel injected are present.

A check may be performed by sign detection unit 250 as to whether a reversal in the sign of the change of the fuel quantity is present. This means that a check may be performed as to whether the outlet has a zero throughput over the time of the fuel quantity to be injected. If this is the case, then in storage unit 262 the instantaneous values of the quantity of fuel to be injected may be stored as old value QKA.

Accordingly, in second storage 265, the instantaneous value of the pressure may be stored as old value PA. In this context, it may be advantageous if the fuel quantity to be injected is filtered by filter 260 before it is stored.

Simultaneous with the detected sign reversal, time counter 270 may be activated. On the basis of instantaneous value QK and old value QKA for the fuel quantity, a differential value QKD may be calculated in node 285, which indicates the change in the fuel quantity since the last sign reversal. Accordingly, in node 287, a corresponding differential value PD for the pressure may be calculated, which characterizes the change in the boost pressure since the last sign reversal.

If the time counter has run down, i.e., a preestablished waiting time since the last sign reversal is elapsed, then differential signal QKD may be compared to a threshold value QKDS using comparator 280. Accordingly, differential pressure PD may be compared to a corresponding threshold value PDS in node 290. If the two values for the difference of fuel quantity QKD and differential pressure PD are each greater than the threshold value, then the device does not detect a fault. If only the difference in fuel quantity QKD is greater than the threshold value, and value PD for the pressure is smaller than threshold value PDS, then the device detects a fault. In this case, a corresponding signal for driving switchover unit 130 may be produced by monitoring unit 150, i.e., by evaluation unit 240.

The mode of operation depicted here is one example embodiment. Other example embodiments may be possible, the check also occurring using other program steps. It is essential that a fault be detected if a change in an operating variable, such as the fuel quantity to be injected, results in no corresponding change in the boost pressure. If, after a sign reversal in the change in the fuel quantity, a change in the fuel quantity correlates with a change in the pressure variable, then no fault is present.

In place of the fuel quantity, other variables may also be used, which characterize the quantity of fuel to be injected, i.e., that are a function of the fuel quantity or that determine the fuel quantity. Thus, for example, a load variable, a torque variable, and/or a drive variable of a quantity actuator may be used.

Figure 3:
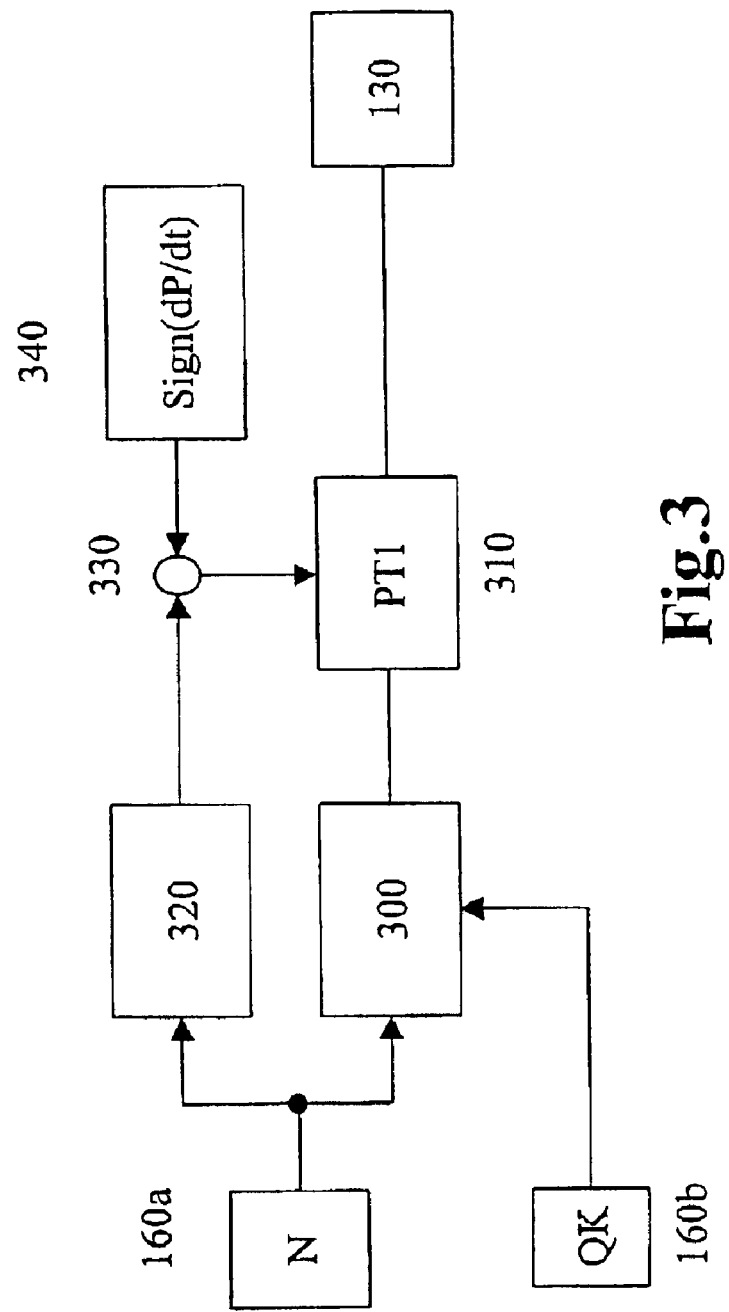
FIG. 3 depicts a block diagram for illustrating the calculation of a substitute value for the boost pressure.

In FIG. 3, simulation unit 135 is depicted in detailed form. The units already described in FIG. 1 are designated using the same signs. Signal N of rotational speed sensor 160a and signal QK with respect to the fuel quantity to be injected arrive at a characteristics map 300, whose output variable may be conveyed via a filter 310 to switching unit 130. Rotational speed N may also be conveyed via a characteristic curve 320 and a node 330 to filter 310. At the second input of node 330, the output signal of a sign determination 340 may be applied.

In characteristics map 300, a value may be stored for boost pressure P as a function of the operating state of the internal combustion engine. This stored value corresponds to the boost pressure in the static state. In order to take into account dynamic states, filter arrangement 310 may be provided. This filter arrangement 310 may be configured as a PT1 filter, and it simulates the temporal curve of the pressure in response to a change in the operating state. It may be advantageous if the response characteristic of this filter arrangement may be varied as a function of the operating state of the internal combustion engine. For this purpose characteristic curve 320 is provided, in which, as a function of at least rotational speed N, a variable is stored which determines the response characteristic of filter arrangement 310, by weighting the time constants of the filter arrangement.

In addition, the response characteristic of the sign determination is set, stipulating, as a function of the sign of the pressure change, a correction variable for correcting the output signal of characteristics map 320. The sign determination ascertains whether the pressure is rising or falling. As an input variable for the sign determination, it may be preferable to use the output signal of characteristics map 300. It may be advantageous if two characteristic curves 320 are provided, the one or the other characteristic curve is used as a function of whether the pressure is rising or falling.

What is claimed is:

1. A method for monitoring a sensor, comprising:

detecting a fault if a change in an operating variable representing a quantity of injected fuel does not result in any corresponding change in an output variable of the sensor;

wherein:

the sensor is a sensor for measuring a pressure variable representing a pressure of air supplied to an internal combustion engine.

2. The method according to claim 1, wherein:

the monitoring of the sensor occurs as a function of a presence of a preestablished operating state.

3. The method according to claim 2, wherein:

the monitoring occurs if a variable representing an air temperature is smaller than a threshold value.

4. The method according to claim 2, wherein:

the monitoring occurs if a preestablished value for at least one of a rotational speed and the quantity of fuel injected is present.

5. The method according to claim 1, further comprising the step of:

correlating, after a sign reversal of a change in the quantity of fuel injected, a change in the quantity of fuel injected with a change in a pressure variable.

6. The method according to claim 5, further comprising the step of:

comparing, a time period after the sign reversal of the change in the quantity of fuel injected, an instantaneous value of the quantity of fuel injected to a value of the quantity of fuel injected at a time point of the sign reversal.

7. The method according to claim 1, further comprising the step of:

using, in response to a detected fault, a substitute value for a controlling arrangement.

8. The method according to claim 7, further comprising the step of:

determining the substitute value on the basis of at least one of the rotational speed and the quantity of fuel to be injected.

9. A device for monitoring a sensor, comprising:

an arrangement for detecting a fault if a change in an operating variable representing a quantity of fuel injected does not result in any corresponding change in an output variable of the sensor;

wherein:

the sensor is a sensor for measuring a pressure variable representing a pressure of air supplied to an internal combustion engine.

* * * * *